United States Patent

Bair et al.

Patent Number: 5,575,924
Date of Patent: Nov. 19, 1996

[54] WATER TREATMENT METHODS

[75] Inventors: Keith A. Bair, Horsham; Elizabeth V. Bissinger, Yardley; Ellen M. Meyer, Doylestown, all of Pa.

[73] Assignee: BetzDearborn Inc., Trevose, Pa.

[21] Appl. No.: 434,227

[22] Filed: May 4, 1995

[51] Int. Cl.$^6$ .................................................. C02F 1/56
[52] U.S. Cl. ............................................ 210/734; 210/735
[58] Field of Search ........................................ 210/732–736

[56] References Cited

U.S. PATENT DOCUMENTS

| | | | |
|---|---|---|---|
| 3,711,573 | 1/1973 | Nagy | 210/736 |
| 4,080,346 | 3/1978 | Bedell | 260/17 A |
| 4,305,829 | 12/1981 | Kelsey et al. | 210/736 |
| 4,308,189 | 12/1981 | Moritani et al. | 260/29.6 WA |
| 4,775,715 | 10/1988 | Beresniewicz et al. | 525/61 |
| 5,075,401 | 12/1991 | Zhang | 527/201 |
| 5,108,622 | 4/1992 | Liao et al. | 210/734 |
| 5,354,803 | 10/1994 | Dragner et al. | 524/503 |

FOREIGN PATENT DOCUMENTS

| | | |
|---|---|---|
| 2214783 | 8/1974 | France . |
| K021361 | of 1987 | Japan . |
| 131003 | 6/1987 | Japan . |

OTHER PUBLICATIONS

Betz Handbook of Industrial Water Conditioning, 9th ed., 1991, Betz Laboratories, Inc., Trevose, PA, pp. 23–30.

*Primary Examiner*—Thomas G. Wyse
*Attorney, Agent, or Firm*—Alexander D. Ricci; Philip H. Von Neida

[57] ABSTRACT

Disclosed are methods for reducing turbidity of aqueous systems and clarifying wastewater systems utilizing a graft copolymer having the structure:

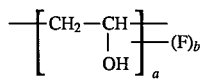

whereby the cationic monomer (F) is represented by

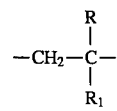

wherein R is hydrogen or a $C_1$ to $C_3$ alkyl group, $R_1$ is the salt of an ammonium cation, and the molar percentage of a:b is from about 95:5 to about 5:95, with the proviso that the sum of a and b equals 100%.

17 Claims, No Drawings

WATER TREATMENT METHODS

FIELD OF THE INVENTION

The present invention relates to methods for water clarification and for treating wastewater systems, and processes for preparing a copolymer.

BACKGROUND OF THE INVENTION

Raw water such as water from rivers, lakes or underground usually contains suspended matter. The suspended matter must be removed by clarification in order to provide water suitable for use in domestic and industrial applications. The suspended matter can consist of large solids, settleable by gravity alone without any external aid, and nonsettleable material, often colloidal in nature. Removal, or separation, of the suspended matter is generally accomplished by coagulation, flocculation, and sedimentation. In combination, these processes are referred to as conventional clarification. (See Betz Handbook of Industrial Water Conditioning, 9th Edition, 1991, Betz Laboratories, Inc., Trevose, Pa., pages 23 through 30.)

Naturally occurring suspended particles are predominantly negatively charged. Water-soluble organic cationic polymers, such as polyamine and polydiallyldimethyl ammonium chloride, are normally used to clarify water having high turbidity (for instance greater than 60 nephelometric units (NTU)). In low turbidity water, less than 60 NTU, there are generally not enough particulates to form a settleable floc when the water is treated with cationic polymer alone.

Inorganic coagulants such as aluminum sulfate, polyaluminum chloride, ferric sulfate, ferric chloride and sodium aluminate are often used in low turbidity waters. These inorganic coagulants are relatively inexpensive and generally effective for water clarification. However, these inorganic coagulants tend to generate voluminous sludge which is difficult to dewater. These inorganic coagulants are also only effective within a particular pH range and require proper pH adjustment of the water during treatment. In addition, residual iron and aluminum ions in the treated water may affect downstream operations such as cooling water and boiler water treatments and may also cause health and environmental problems when the water is discharged.

Water soluble/dispersible melamine formaldehyde resins have also been employed for the clarification of low turbidity waters. The residual formaldehyde in the resin, however, raises handling, use and disposal difficulties. The present invention provides methods of clarifying water without incurring the disadvantages realized in the use of certain cationic polymers, inorganic coagulants and melamine formaldehyde resins.

SUMMARY OF THE INVENTION

The present invention provides for methods for reducing the turbidity of aqueous systems, clarifying wastewater systems and processes for preparing a graft copolymer of polyvinyl alcohol and a cationic monomer.

DESCRIPTION OF THE RELATED ART

U.S. Pat. No. 4,080,346, Bedell et al., teaches methods for grafting cationic and nonionic monomers onto polyvinyl alcohol using a transition metal ion catalyst. The resulting polymers prove useful as dye mordents. U.S. Pat. No. 4,308,189, Moritani et al., teaches a method for preparing modified polyvinyl alcohol polymers via an emulsion process whereby a random copolymerization of vinyl acetate and cationic monomers is carried out. The resulting copolymers are used as a binder in pulp and textiles.

U.S. Pat. No. 4,775,715, Beresniewicz et al., teaches a process for making cationic polyvinyl alcohol using mechanical shear and a non-alkylene quaternary ammonium halide. This process achieved conversions up to 40%. The quaternized polyvinyl alcohol was used as a flocculating agent, a stabilizing colloid, and in adhesive formulations. U.S. Pat. No. 5,075,401, Zhang teaches anionic graft copolymers useful in oil recovery. These copolymers are prepared using a reverse phase emulsion polymerization technique. U.S. Pat. No. 5,345,803, Dragner et al., teaches grafting of predominantly non water soluble monomers onto polyvinyl alcohol using potassium persulfate or ammonium hydroxide as the initiator. The grafted product is a latex emulsion useful as binders for non-woven products.

French patent 2,214,687 teaches grafting of cationic monomers onto cellulose, polyvinyl alcohol, polyamides or polyethylene terephthalate using electron irradiation as the initiator, however, cerium is conjectured as a potential free radical initiator. The resulting polymers are used to improve dyeability of polymers. Japanese patent 131,003 teaches a polyvinyl alcohol grafted with acrylamido-type monomers using basic catalysts such as sodium hydroxide having efficacy as sizing agents.

Japanese Kokoku publication No. 21361 teaches a modified polyvinyl alcohol which is prepared by polymerizing vinyl acetate with other monomers such as hydrophobic acrylamides. The vinyl acetate is hydrolyzed after polymerization with the comonomers to form the polyvinyl alcohol.

DETAILED DESCRIPTION OF THE INVENTION

The present invention relates to methods for clarifying aqueous systems, such as influent water, wastewater and oily wastewater systems, comprising adding to the aqueous system an effective amount of a graft copolymer obtained by graft copolymerizing cationic monomers onto polyvinyl alcohol.

The resulting polyvinyl alcohol graft copolymer has the general structure:

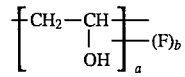 FORMULA I whereby the cationic monomer (F) is represented by

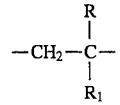 FORMULA II wherein R in Formula II is hydrogen or a $C_1$ to $C_3$ alkyl group and $R_1$ is the salt of an ammonium cation.

The ammonium cation, $R_1$, has the structure $OR_2N^+R_{3,4,5}M^-$ wherein $R_2$ is a $C_1$ to $C_4$ linear or branch chain alkyl group, $R_3$, $R_4$ and $R_5$ are selected from the group consisting of hydrogen, $C_1$ to $C_4$ linear or branch chain alkyl, $C_5$ to $C_8$ cycloalkyl, $C_5$ to $C_8$ aromatic or $C_5$ to $C_8$ alkylaromatic group and M is an anion selected from the group consisting of chloride, bromide, methyl sulfate and hydrogen sulfate.

The molar percentage of a:b in Formula 1 is from about 95:5 to about 5:95, with the proviso that the sum of a and b is 100%.

The cationic monomers can be selected from the group containing ethylenically unsaturated quaternary ammonium, phosphonium or sulfonium ions. Preferably the cationic monomers are selected from the group including but not limited to 2-acryloyloxyethyltrimethylammonium chloride (AETAC), 2-methacryloyloxyethyltrimethylammonium chloride (METAC), 3-methacrylamidopropyltrimethylammonium chloride (MAPTAC), dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride, and diallyldiethyl ammonium chloride.

Most preferably, the cationic monomer is 2-methacryloyloxyethyltrimethylammonium chloride.

The number average molecular weight (Mn) of the resulting copolymer is not critical as long as it is water soluble. The number average molecular weight is preferably in the range of 1,000 to 1,000,000 with a Mn range of 1,500 to 500,000 more preferable. Most preferably, the number average molecular weight will range from 1,500 to 100,000.

The preferred means of grafting the cationic monomer onto the polyvinyl alcohol is by a solution polymer process using cerium IV as a redox initiator. The methodology for synthesizing polyvinyl alcohol graft copolymers has been well documented in the literature and synthesis procedures similar to those described in U.S. Pat. No. 4,080,346 were utilized in this invention. The contents of U.S. Pat. No. 4,080,346 are hereby incorporated by reference herein.

Ceric ammonium nitrate is used as the initiator although other cerium containing molecules which are oxidants such as ceric ammonium sulfate and ceric sulfate may also be used. The present inventors anticipate that other lanthanides such as europium, ytterbium and samarium and transition metals having more than one oxidation state such as vanadium and manganese may also be employed as initiators.

Conventional initiators such as azo compounds, persulfates, peroxides and redox couples may also be employed. It is to be understood that the aforementioned polymerization methods do not limit the synthesis of the copolymers useful in this invention.

The reaction temperature is not critical and generally occurs between 20° and 99° C., preferably 35° to 65° C. The pH of the reaction mixture is not critical and is generally in the range of 4 to 6. The resulting copolymer structure has been verified by $^{13}$C NMR, IR spectroscopy, and viscosity studies.

The present inventors anticipate that in another embodiment of the invention that anionic and nonionic monomers can be grafted onto the polyvinyl alcohol with or without cationic monomer present.

The anionic monomer can be selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2-methyl propane sulfonic acid (AMPS®) and 3-allyloxy-2-hydroxypropane sulfonic acids and salts thereof.

The nonionic monomer can be selected from the group of ethylenically unsaturated nonionic monomers which comprise but are not limited to acrylamide, methacrylamide, N-methylolacrylamide, N,N-dimethylacrylamide; lower alkyl ($C_1$–$C_6$) esters including vinyl acetate, methyl acrylate, ethyl acrylate, and methyl methacrylate; hydroxylated lower alkyl ($C_1$–$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates.

The resulting polyvinyl alcohol/cationic polymers should be added to the aqueous system to be treated in an amount sufficient for its intended purpose. For the most part, this amount will vary depending upon the particular aqueous system for which treatment is desired and can be influenced by such variables as turbidity, pH, temperature, quantity of water and the type of contaminants present in the water. The copolymers are effective at a wide range of system pHs and should prove effective at the pH of any aqueous system for which water treatment is sought. The copolymers are preferably added to the aqueous system in amounts ranging from 0.1 to 10,000 parts or more preferably 0.5 to 5,000 parts per million parts water. The copolymers may be added to the aqueous system neat or as an aqueous solution in either an intermittent or continuous fashion.

The copolymers of the present invention prove useful in a variety of aqueous systems containing different contaminants but are well suited to the reduction of turbidity, color and the clarification of aqueous systems such as influent water, wastewater and oily wastewater systems.

Those skilled in the art will recognize the many applications in which these copolymers will find utility. These utilities include, but are not limited to, wastewater treatment applications, influent water clarification, color reduction, secondary water clarification, oily wastewater treatment, treatment of proteinaceous containing wastewater, protein recovery, emulsion breaking, sludge dewatering, upflow filter clarification, horizontal flow clarification, and the like.

EXAMPLES

Preparation of polyvinyl alcohol/2-methacryloyloxyethyltrimethylammonium chloride (PVNMETAC) graft copolymer (1/1 molar ratio).

A suitable flask was equipped with a mechanical stirrer, thermocouple and nitrogen line. 57.3 g of a PVA solution (0.2 moles, 15.3%), 55.3 g of METAC (0.2 moles, 75%), 70:0 g $H_2O$ and six drops of 1M $HNO_3$ were charged to the flask. This solution was purged with nitrogen for one hour. 3.29 g of ceric ammonium nitrate dissolved in 9 g of water was then shot fed to the flask. The nitrogen purge was continued for the duration of the reaction. After allowing the temperature to equilibrate, the solution was heated to 35° C. and held for 3 hours.

The copolymer solution had a Brookfield viscosity of 108 cps at 28.0% solids and 25° C. The structure of the copolymer was verified by $^{13}$C NMR. There was no sign of residual monomer in the spectrum.

Similar procedures were used to prepare copolymers of PVA/METAC with different mole ratios. Table I summarizes the physical and chemical properties of these PVA/METAC copolymers.

TABLE I

| Example | Polymer Composition | Copolymer Ratio | % Solids | Brookfield Viscosity (cps) |
| --- | --- | --- | --- | --- |
| 1 | PVA/METAC | 1/1 | 28.0 | 148 |
| 2 | PVA/METAC | 2.5/1 | 23.0 | 80 |
| 3 | PVA/METAC | 1/2.5 | 17.5 | 40 |
| 4 | PVA/METAC | 1/5 | 21.9 | 99 |
| 5 | PVA/METAC | 2.5/1 | 22.8 | 433 |

The data set forth below demonstrate the unexpected results occasioned by the use of the present invention. The following examples are included as being an illustration of the invention and should not be construed as limiting the scope thereof.

Testing was performed on synthetic river water as a means to simulate the operation of a typical water treatment clarifier. The synthetic river water was prepared from distilled water, reagent grade chemicals, and naturally occurring clays and humic acid. The test substrate was prepared to have the following properties:

Turbidity=80 NTU

Total suspended solids=300 mg/liter

Ca=20 ppm as $CaCO_3$

Mg=10 ppm as $CaCO_3$

Methyl orange alkalinity=50 ppm as $CaCO_3$ pH=7.0

Examples 1 to 5 were tested along with two commercial clarification treatments: epichlorohydrin-dimethylamine polymer and polydiallyldimethylammonium chloride.

The test procedure comprised placing 200 mL of synthetic river water into a 250 mL beaker. While the sample was mixed at 100 rpm, the polymer to be tested was added at the desired dosage. After polymer addition, the samples were mixed for 2 minutes at 100 rpm and 5 minutes at 35 rpm. The mixing was stopped and the sample was allowed to settle for 5 minutes. The turbidity of the supernatant was measured using a Hach Ratio/XR turbidity meter. The results of this synthetic river water jar testing are presented in Table II.

TABLE II

Synthetic River Water
pH = 6.98
Raw turbidity = 80.0
Blank turbidity = 71.9
Turbidity (NTU)

| | Polymer (Dosage (ppm)) | | | | | | | | | |
|---|---|---|---|---|---|---|---|---|---|---|
| | 1.5 | 2.5 | 5.0 | 6.0 | 7.5 | 8.5 | 10.0 | 12.0 | 15.0 | 17.0 |
| 2 | 30.60 | 19.32 | 8.59 | 4.90 | 3.80 | | 2.53 | 1.59 | 0.997 | 1.15 |
| 1 | | 48.00 | 24.20 | 16.03 | 10.26 | | 2.36 | 1.10 | 0.963 | 1.194 |
| 5 | | 60.90 | 31.50 | 22.90 | 17.56 | | 5.14 | 1.93 | 0.868 | 0.934 |
| 3 | | 51.50 | 23.00 | 16.72 | 4.54 | | 1.698 | 1.21 | 1.30 | |
| 4 | | 60.10 | 38.60 | 26.60 | 5.77 | | 1.198 | 0.934 | 1.298 | |
| POLYDADMAC | | 65.60 | 36.50 | 34.10 | 10.80 | 2.68 | 1.40 | 1.52 | 2.95 | |
| EPI-DMA | | 68.40 | 46.80 | 42.50 | 12.84 | 7.68 | 1.13 | 0.94 | 1.19 | |

EPI-DMA is an epichlorohydrin-dimethylamine polymer.
POLYDADMAC is polydiallyldimethylammonium chloride.

These testing results demonstrate that the polymers, Examples 1–5, of the present invention were as effective at clarifying water as the known water clarification treatment polymers, EPI-DMA and POLYDADMAC.

Examples 1–5 of the present invention were also tested in oily wastewater jar tests. Oily wastewater from a steel mill was tested and had the following properties:

Turbidity=>2000 NTU

Total organic carbon (TOC), as C=490 ppm pH=11.2

The test procedure comprised placing 200 mL of wastewater into a 250 mL beaker. While the sample was mixed at 100 rpm, the polymer to be tested was added at the desired dosage. After polymer addition, the samples were mixed for 2 minutes at 100 rpm and 5 minutes at 35 rpm. The mixing was stopped and the sample was allowed to settle for 5 minutes. The turbidity of the supernatant was measured using a Hach Ratio/XR turbidity meter. The results of this testing are presented in Tables III and IV.

TABLE III

Turbidity testing
Oily wastewater jar test
Turbidity (NTU)

| Dosage | Polymer (Example No.) | | | | | |
|---|---|---|---|---|---|---|
| (ppm active) | 2 | 5 | 1 | 3 | 4 | EPI-DMA |
| 100 | 1379 | 815 | 504 | 683 | 525 | |
| 150 | 1381 | 785 | 372 | 488 | 464 | |
| 200 | 857 | 648 | 385 | 580 | 460 | |
| 250 | 1160 | 718 | 542 | 558 | 398 | |
| 300 | 1003 | 771 | 639 | 654 | 422 | |
| 350 | 777 | 920 | 769 | 623 | 495 | |
| 500 | 753 | 1137 | 654 | 808 | 682 | 190 |
| 1000 | | | | | | 850 |
| 1500 | | | | | | 1207 |
| 2500 | | | | | | 480 |
| 3000 | | | | | | 610 |

TABLE IV

Total organic carbon
Oily wastewater jar test
TOC (ppm)

| | Polymer (Example No.) | | | | |
|---|---|---|---|---|---|
| Dosage (ppm active) | 2 | 5 | 1 | 3 | 4 |
| 0 | 465 | 465 | 465 | 465 | 465 |
| 100 | 440 | 425 | 375 | 390 | 395 |
| 150 | 480 | 400 | 345 | 380 | 375 |
| 200 | 480 | 405 | 330 | 345 | 335 |
| 250 | 475 | 370 | 325 | 335 | 325 |
| 300 | 480 | 335 | 360 | 340 | 325 |
| 350 | 445 | 360 | 420 | 320 | 340 |
| 500 | 485 | 390 | 470 | 350 | 395 |

The results presented in Tables III and IV demonstrate that the inventive polymers are efficacious at clarifying oily wastewater systems.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for reducing the turbidity of an aqueous system comprising adding to said aqueous system an effective amount of a graft copolymer having the formula

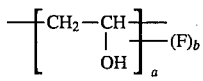

whereby the cationic monomer (F) is represented by

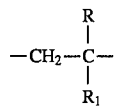

wherein R is hydrogen or a $C_1$ to $C_3$ alkyl group, $R_1$ is the salt of an ammonium cation, and the molar percentage of a:b is from about 95:5 to about 5:95, with the proviso that the sum of a and b equals 100%.

2. The method as claimed in claim 1 wherein $R_1$ has the structure $OR_2N^+R_{3,4,5}M^-$, wherein $R_2$ is a $C_1$ to $C_4$ linear or branch chain alkyl group, $R_3$, $R_4$ and $R_5$ are selected from the group consisting of hydrogen, $C_1$ to $C_4$ linear or branch chain alkyl, $C_5$ to $C_8$ cycloalkyl, $C_5$ to $C_8$ aromatic or $C_5$ to $C_8$ alkylaromatic group; and M is an anion selected from the group consisting of chloride, bromide, methyl sulfate and hydrogen sulfate.

3. The method as claimed in claim 1 wherein F is a cationic monomer selected from the group consisting of 2-acryloyloxyethyltrimethylammonium chloride, 3-methacrylamidopropyltrimethylammonium chloride, 2-methacryloyloxyethyltrimethylammonium chloride, and diallyldimethylammonium chloride.

4. The method as claimed in claim 1 wherein said copolymer has a number average molecular weight from about 1,000 to 1,000,000.

5. The method as claimed in claim 1 wherein said copolymer has a number average molecular weight from about 1,500 to 500,000.

6. The method as claimed in claim 1 wherein said copolymer has a number average molecular weight from about 1,500 to 100,000.

7. The method as claimed in claim 1 wherein said copolymer is added to said aqueous system in an aqueous solution.

8. The method as claimed in claim 1 wherein said copolymer is added to said aqueous system in an amount ranging from 0.1 parts to 10,000 parts per million parts aqueous system.

9. A method for clarifying a wastewater system comprising adding to said wastewater system an effective amount of a graft copolymer having the formula

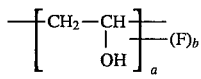

whereby the cationic monomer (F) is represented by

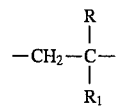

wherein R is hydrogen or a $C_1$ to $C_3$ alkyl group, $R_1$ is the salt of an ammonium cation, and the molar percentage of a:b is from about 95:5 to about 5:95, with the proviso that the sum of a and b equals 100%.

10. The method as claimed in claim 9 wherein $R_1$ has the structure $OR_2N^+R_{3,4,5}M^-$, wherein $R_2$ is a $C_1$ to $C_4$ linear or branch chain alkyl group, $R_3$, $R_4$ and $R_5$ are selected from the group consisting of hydrogen, $C_1$ to $C_4$ linear or branch chain alkyl, $C_5$ to $C_8$ cycloalkyl, $C_5$ to $C_8$ aromatic or $C_5$ to $C_8$ alkylaromatic group; and M is an anion selected from the group consisting of chloride, bromide, methyl sulfate and hydrogen sulfate.

11. The method as claimed in claim 9 wherein F is a cationic monomer selected from the group consisting of 2-acryloyloxyethyltrimethylammonium chloride, 3-methacrylamidopropyltrimethylammonium chloride, 2-methacryloyloxyethyltrimethylammonium chloride, and diallyldimethylammonium chloride.

12. The method as claimed in claim 9 wherein said copolymer has a number average molecular weight from about 1,000 to 1,000,000.

13. The method as claimed in claim 9 wherein said copolymer has a number average molecular weight from about 1,500 to 500,000.

14. The method as claimed in claim 9 wherein said copolymer has a number average molecular weight from about 1,500 to 100,000.

15. The method as claimed in claim 9 wherein said copolymer is added to said aqueous system in an aqueous solution.

16. The method as claimed in claim 9 wherein said copolymer is added to said aqueous system in an amount ranging from 0.1 parts to 10,000 parts per million parts aqueous system.

17. The method as claimed in claim 9 wherein said wastewater system is an oily wastewater system.

* * * * *